(12) United States Patent
Maney et al.

(10) Patent No.: US 10,435,882 B2
(45) Date of Patent: Oct. 8, 2019

(54) BUILDING CONNECTION ARRANGEMENT

(71) Applicant: STUDCO AUSTRALIA PTY LTD, Croydon South (AU)

(72) Inventors: David Maney, Croydon South (AU); Simon McKechnie, Croydon South (AU); Bill Hendricks, Croydon South (AU); Warwick McAlpin, Croydon South (AU)

(73) Assignee: STUDCO AUSTRALIA PTY LTD. (AU)

( * ) Notice: Subject to any disclaimer, the term of this patent is extended or adjusted under 35 U.S.C. 154(b) by 0 days.

(21) Appl. No.: 16/199,921

(22) Filed: Nov. 26, 2018

(65) Prior Publication Data

US 2019/0093336 A1  Mar. 28, 2019

Related U.S. Application Data

(62) Division of application No. 15/483,271, filed on Apr. 10, 2017, now abandoned.

(30) Foreign Application Priority Data

Apr. 11, 2016 (AU) ................................ 2016901337
Jun. 10, 2016 (AU) ................................ 2016902270

(51) Int. Cl.
  *E04B 1/24* (2006.01)
  *E04B 2/76* (2006.01)
  (Continued)

(52) U.S. Cl.
  CPC .......... *E04B 1/2403* (2013.01); *E04B 1/1903* (2013.01); *E04B 2/767* (2013.01); *E04B 2/768* (2013.01); *F16B 2/20* (2013.01); *F16B 5/06* (2013.01); *E04B 2001/1924* (2013.01); *E04B 2001/1993* (2013.01);
  (Continued)

(58) Field of Classification Search
  CPC .. E04B 2/767; E04B 2/768; F16B 5/06; F16B 2/20; F16B 2/22; F16B 2/241
  USPC ...... 52/241, 655.1, 573.1; 403/397; 24/67.9; D8/395
  See application file for complete search history.

(56) References Cited

U.S. PATENT DOCUMENTS 2,214,947 A * 9/1940 Wetzel .................... B60R 13/04
                                                  52/127.6
2,555,562 A * 6/1951 Bales ..................... A47B 57/58
                                                   24/581.1
(Continued)

FOREIGN PATENT DOCUMENTS

GB      1129174 A  * 10/1968  ............. F16B 2/245
GB      2029894 A  *  3/1980

*Primary Examiner* — Robert Canfield

(74) *Attorney, Agent, or Firm* — Woods Oviatt Gilman LLP; Katherine H. McGuire, Esq.

(57) ABSTRACT

A clip (2) for fitting between a first component (6) and a second component (4) in a building structure, the clip including a first member (8), a second member (10) and a connecting portion (12) connecting the first member (8) to the second member (10); the first member (8), the second member (10) and the connecting portion (12) forming a space (38) in which a portion of a leg (18) of the second component (4) is adapted to reside; the first member (8) and the second member (10) adapted for engagement with the portion of the leg (18) of the second component (4).

3 Claims, 7 Drawing Sheets

(51) Int. Cl.
*F16B 2/20* (2006.01)
*F16B 5/06* (2006.01)
*E04B 1/19* (2006.01)
*F16B 7/04* (2006.01)

(52) U.S. Cl.
CPC ........... *E04B 2001/2409* (2013.01); *E04B 2001/2415* (2013.01); *E04B 2001/2421* (2013.01); *E04B 2001/2436* (2013.01); *F16B 7/0446* (2013.01); *Y10T 24/205* (2015.01); *Y10T 403/60* (2015.01)

(56) References Cited

U.S. PATENT DOCUMENTS

| | | | | |
|---|---|---|---|---|
| 2,565,636 A * | 8/1951 | Tinnerman | ............... | F16B 2/241 24/336 |
| 2,905,992 A * | 9/1959 | Swick | ............... | F16B 5/06 24/581.1 |
| 3,332,568 A * | 7/1967 | Zumwalt | ............... | F16B 12/26 220/592.02 |
| 3,575,371 A * | 4/1971 | Carlstedt | ............... | B63B 21/08 24/129 B |
| 3,669,170 A * | 6/1972 | Schuster | ............... | F16B 37/041 411/175 |
| 3,702,047 A * | 11/1972 | Harcuba | ............... | E06B 3/5481 52/241 |
| 4,376,361 A * | 3/1983 | Michael | ............... | E04B 2/825 52/241 |
| 4,520,607 A * | 6/1985 | Suckow | ............... | E04B 9/26 24/336 |
| 5,083,409 A * | 1/1992 | Pliml, Jr. | ............... | E06B 3/44 403/297 |
| 5,214,825 A * | 6/1993 | Hirzel | ............... | B42F 1/02 24/547 |
| 5,423,646 A * | 6/1995 | Gagnon | ............... | F16B 37/041 411/174 |
| D363,453 S * | 10/1995 | Herdt | ............... | D11/78.1 |
| 5,671,580 A * | 9/1997 | Chou | ............... | E06B 3/968 403/230 |
| D759,475 S * | 6/2016 | Banno | ............... | D8/395 |
| 2002/0170260 A1* | 11/2002 | Wheeler | ............... | E04B 2/7457 52/656.1 |
| 2004/0045137 A1* | 3/2004 | Hsiao | ............... | B42F 1/02 24/67.9 |
| 2007/0193187 A1* | 8/2007 | O'Connor | ............... | E04B 2/7457 52/653.1 |

* cited by examiner

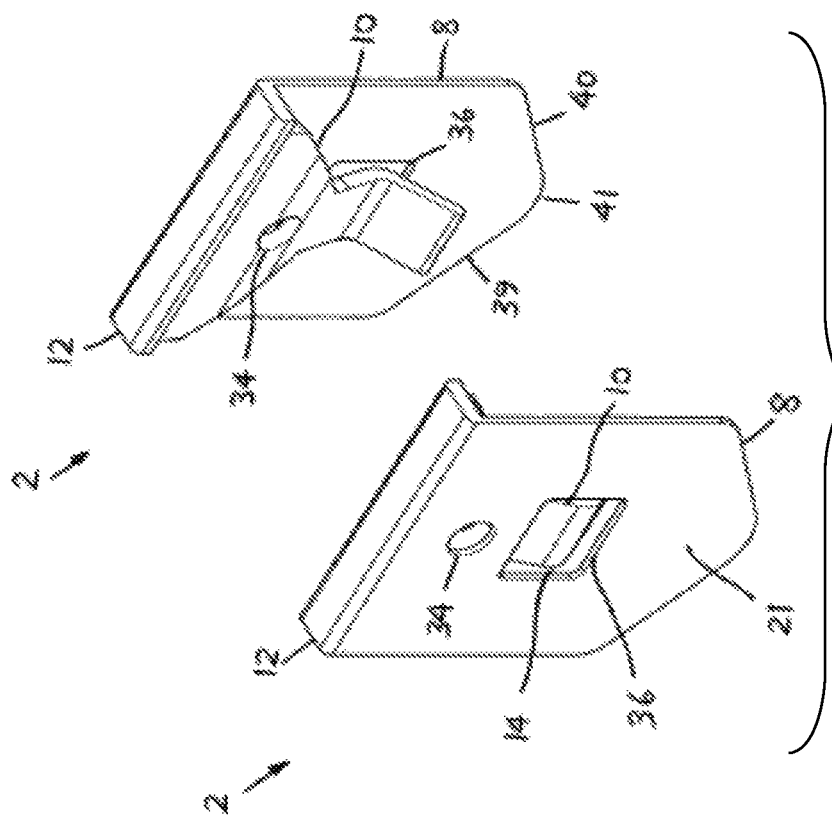
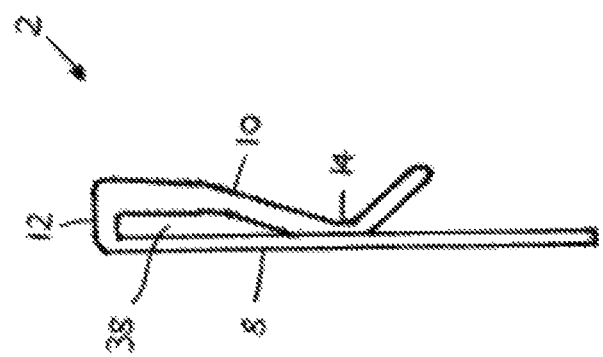

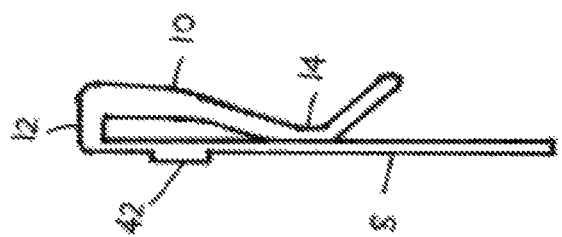
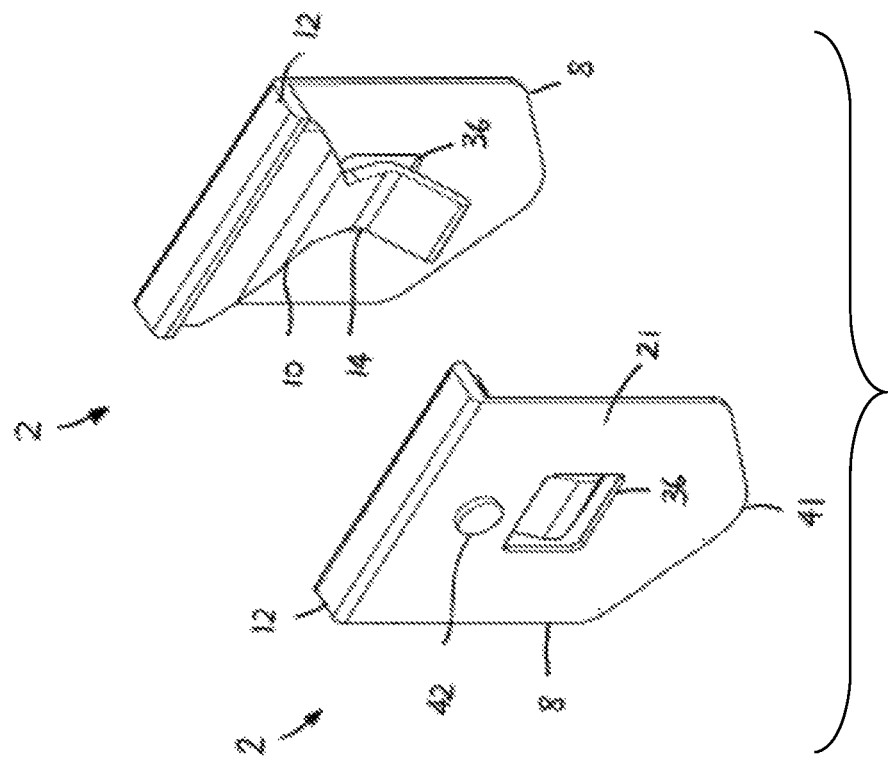

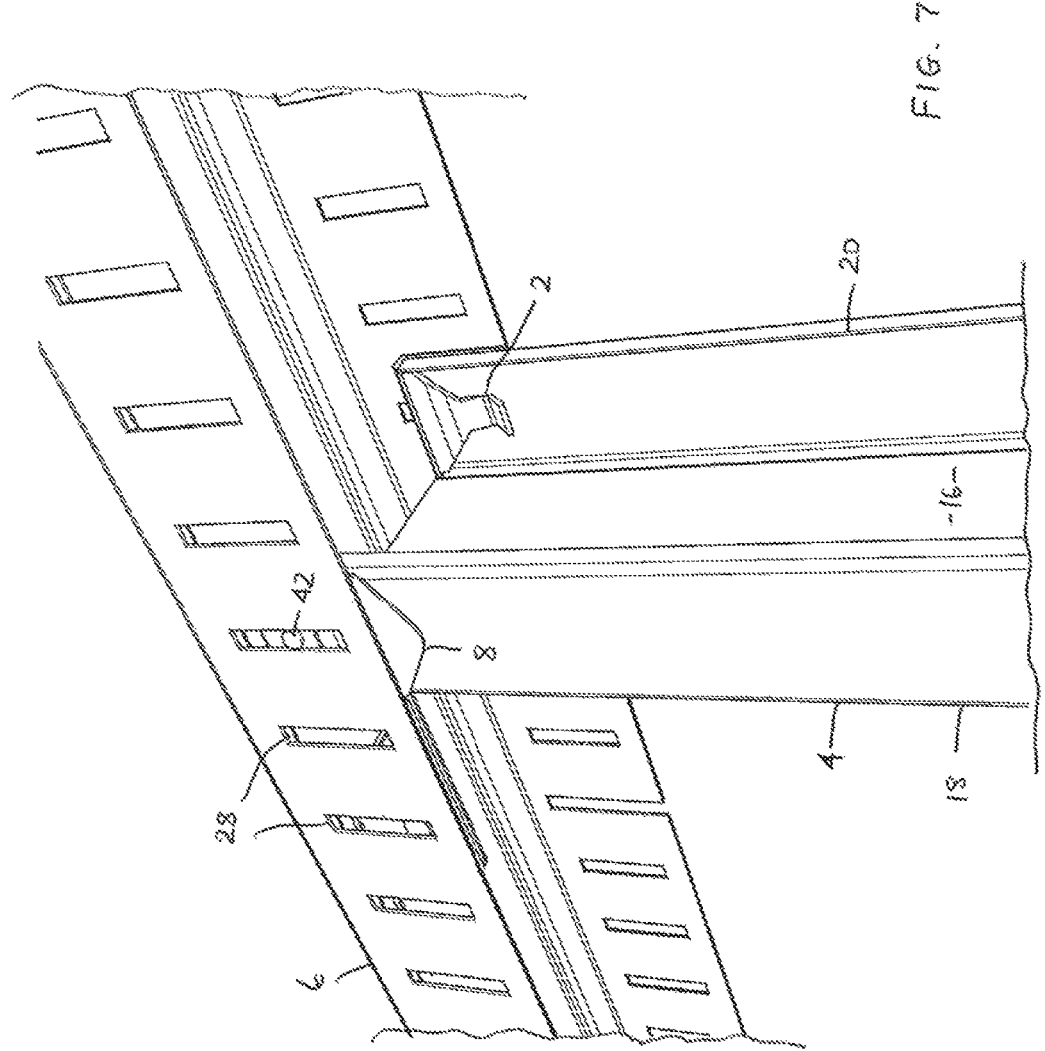

BUILDING CONNECTION ARRANGEMENT

CROSS-REFERENCE TO RELATED APPLICATIONS

This application is a divisional of U.S. patent application Ser. No. 15/483,271, filed Apr. 10, 2017.

FIELD OF THE INVENTION

This invention relates to a building connection arrangement and more particularly relates to an arrangement for separating a first member, such as a track, from a second member, such as a stud in a building structure. More particularly, the invention relates to a clip for providing the engagement and/or separation of the first member and second member and also to a fastening device for securing the first member to the second member.

BACKGROUND OF THE INVENTION

The existing connection arrangements for a first member, such as a track, and a second member, such as a wall stud, either at the top or the bottom of the stud, provide little or no insulation acoustically. Vibrations in the building structure can be caused by building movement such as wind sway, inter-story shifting, vortex shedding or vertical deflection. Other movements that lead to poor acoustic properties at the interface between the stud and the track include impacts by pedestrians within a building or from machinery vibrations. Furthermore with the direct connection of the steel stud to the steel track, existing arrangements have allowed for a fast thermal transfer at the stud track interface. This is significant in the case of a fire risk or heat damage.

Furthermore, in relation to existing fastening devices, such as screws, used to secure a stud to a track, it is difficult to temporarily hold a screw in position whilst also aligning the desired position of the stud with the track and then being able to adjust the position of the screw.

The present invention seeks to reduce or attenuate vibrations and thermal transfer at the stud-track interface and to provide a more stable arrangement for applying screws to secure, where necessary, the stud to the track.

SUMMARY OF THE INVENTION

According to a first aspect of the invention, there is provided a clip for fitting between a first component and a second component in a building structure, said clip including:

a first member, a second member and a connecting portion connecting the first member to the second member;

said first member, said second member and said connecting portion forming a space in which a portion of a leg of the second component is adapted to reside;

said first member and said second member adapted for engagement with said portion of the leg of said second component.

Preferably, the first or second member of the clip has a section protruding towards the other member to provide tension to the second component leg portion. Preferably, said clip is adapted to be retained within said first component.

The first component is preferably a substantially horizontal track and the second component is a substantially vertical stud. The other of the second member or the first member of the clip may be substantially straight and frictionally engages against a surface of a flange of the first component. The clip preferably provides a frictional fit to retain the first and second components in an interference engagement.

The first component of the clip preferably has a first flange, a second flange and a connecting portion that connects said first flange to said second flange and said second component has a first leg, a second leg and an intermediate portion connecting said first leg to said second leg. At least one of said first flange or said second flange can have one or more slots.

The first member or the second member of said clip may have a protrusion that frictionally fits within any one of said one or more slots. A fastener means can be used to secure the clip and the second component to the first component. The first member and second member of the clip may have an aperture for the fastener means to protrude through.

The section protruding towards the other member is preferably a knee or elbow that in a resting, unused position is biased to be substantially in the same plane as an opening located within the opposite member of the clip. An indicator portion may be located at a lower part of one of the first or second members to indicate the length of the second component hidden or protruding from a lower edge of one or both flanges of the first component.

According to a second aspect of the invention, there is provided a fastening means for securing a first component to a second component in a building structure, said fastening means including:

a head portion;

a threaded shaft affixed to the head portion at a junction;

a recess or slit formed in the shaft adjacent the junction; wherein said recess or slit is adapted to fit and be secured within a slot formed in the first component to enable the fastening means to secure the first component to the second component.

Preferably the fastening means is able to be moved within the slot to a desired position before affixing said fastening means.

The slot is preferably one of a plurality of slots formed in a flange of said first component. An underside of the head portion preferably presents a substantially large contact area with said flange on either side of said slot to provide additional grip to secure and strengthen the connection of the second component to the first component. The fastening means may be used with the clip of the first aspect of the invention.

BRIEF DESCRIPTION OF THE DRAWINGS

Preferred embodiments of the invention will hereinafter be described, by way of example only, with reference to the drawings in which:

FIG. 1 is a perspective view from above of a pair of clips, with each clip arranged to be located at a first end of opposed sides or legs of a second component, such as stud;

FIG. 2 is side view of the clip shown in FIG. 1;

FIG. 5 is a perspective view from above, similar to FIG. 1, of a pair of clips but instead of having an aperture through an upper portion of the clip there is a projection on one member of each of the clips;

FIG. 6 is a side view of the clip shown in FIG. 5;

FIG. 7 is a perspective view from below showing the connection of a stud to a track using a pair of clips shown in FIG. 5;

DETAILED DESCRIPTION OF THE PREFERRED EMBODIMENTS

Figure 3:
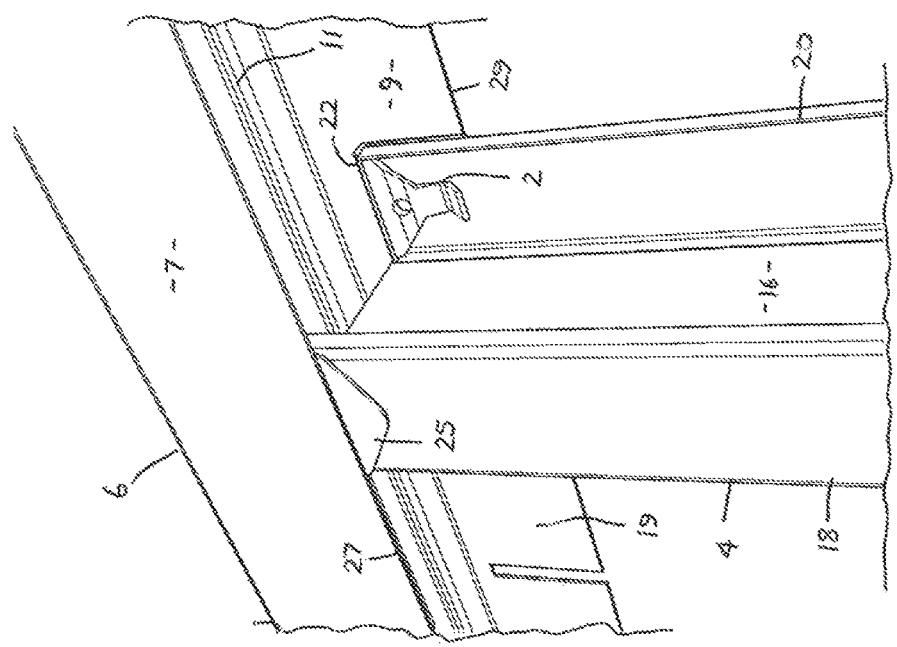
FIG. 3 is a perspective view from below showing the connection of the stud to a first component, such as a track, that has a series of slots located in each of the flanges of the track and showing a separate clip locating a stud to a corresponding flange of the track.
Figure 4:
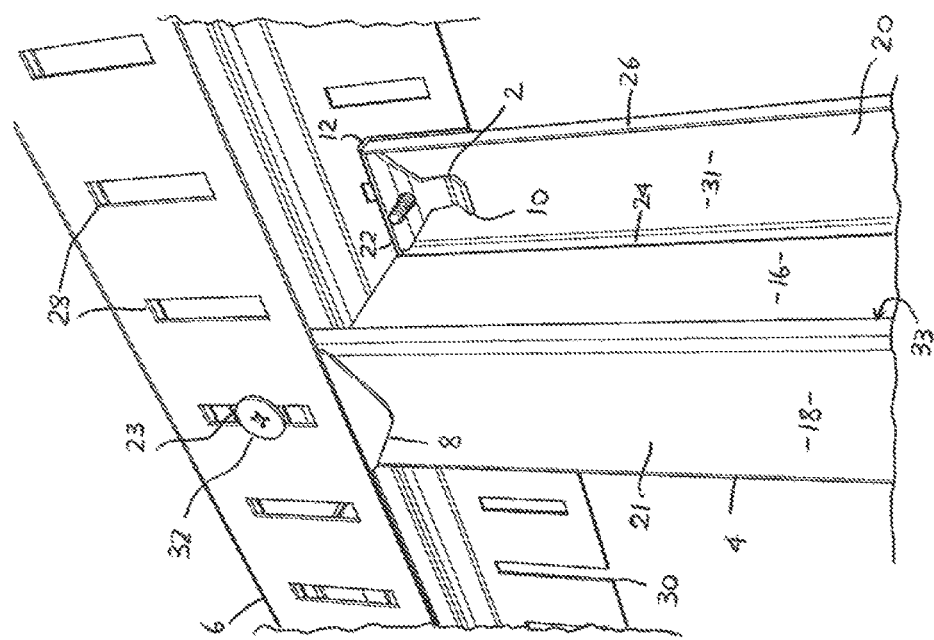
FIG. 4 is a perspective view from below, similar to FIG. 3, except that there are no slots provided in the track flanges and connection of the stud to the track is formed without the use of fastening means.

Referring to FIGS. 1 to 4, there is shown a clip 2 that, together with a further clip 2, is used to secure a vertical second component, such as a stud 4, to a horizontal first component, such as a track 6 (shown in FIGS. 3 and 4). The clip 2 has a first leg or member 8 and a second leg or member 10 that are joined by a web or connection portion 12. The track 6 has a pair of first and second flanges 7 and 9 bridged by a connecting portion 11. The stud 4 has a pair of first and second legs 18 and 20 that are bridged and connected by intermediate portion 16. The outer surface of first member 8 engages with an inner surface of second flange 9 of track 6 as seen in FIG. 4, when one of the clips 2 is fitted to second leg 20 of stud 4. Similarly, the outer surface of member 8 of the other clip 2 engages with an inner surface of first flange 7 of track 6 as seen in FIG. 4, when the other clip 2 is fitted to first leg 18 of stud 4. Member 8 of clip 2 is substantially straight and is generally longer than second member 10 which is not straight and has an elbow or knee 14 having a portion that can project into an opening 36 (more clearly shown in the left clip 2 in FIG. 1). The purpose of the knee or elbow 14 is to provide tension to the section of leg 20 (and leg 18) of stud 4 which fits between the pair of members 8 and 10. The knee 14 provides the requisite tension to hold the legs 18, 20 in position in the space 38 (see FIG. 2) between the members 8 and 10. The leg 20 has a top portion 22 and two side portions 24 and 26 that are upright from or perpendicular to the web 31 of leg 20. Upright portion 24 connects to the web or connecting portion 16 of the stud 4. The top section 22 fits within the space 38 generally, but not necessarily against the inside of the connecting portion 12 of clip 2 and is secured in place by the tension created by the pair of members 8 and 10 and in particular with the protruding section or knee 14. Opening 36 exists to provide tension in the thin first member 8. The protruding section or knee is biased to be located in substantially the same plane as opening 36 when the clip 2 is in a resting and unused position. The clip 2 is preferably made from plastics material. The clip 2 can alternatively be fitted to the bottom section of the stud 4 to join to a track 6. The connection or engagement of clip 2 to the leg 18 (which has a corresponding top portion and side portions) of stud 4 is similarly to that described in relation to the connection of clip 2 to leg 20.

In FIG. 4 there is shown a pair of clips 2 fitting to respective legs 18 and 20 of stud member 4 at the top end thereof and that fit within the interior open space 19 of the channel of the track 6, bounded by flanges 7, 9 and connecting portion or web 11. The outer face 21 of each of the first members 8 provides an interference or frictional fit against the internal surfaces of the flanges 7 and 9 of track 6, respectively. Thus, once the stud 4 is engaged within the track 6, there is no up and down movement possible due to the frictional engagement of the respective surfaces of the members 8 (of respective clips 2) and the interior surfaces of the flanges 7 and 9. A lower portion of member 8 has a pair of angled sides 39 and 40 that meet at a lowest point 41, to form an indicator portion, and this allows a user to check the length of stud 4 when it is in situ. Any sideways movement of the stud 4, that is, within the channel or interior space 19 provided in track 6, is prevented when plaster board lining is in place in a wall, for example. There are some situations where the track 6 need not be screwed or fastened to the stud 4 and in these cases the embodiment of the clip 2 shown in FIG. 4 is used and as mentioned above, when the plaster board wall is in place then that prevents the sideways movement of the stud 4 within the track 6.

Referring to FIG. 1 again, there is provided an aperture 34 above the opening 36 that extends through both members 8 and 10 and this allows a fastening means, such as a screw 32, to protrude therethrough. The screw 32 is shown in FIG. 3 to also protrude through one of the slots 28 in either or both flanges 7, 9 of track 6. The plurality of slots 28 allows the position of the track 6 in relation to the stud 4 to be variable and also allows the screw 32 to be able to slide up and down within each slot 28 to provide positional variation. The screw 32 fitted on either side of the stud 4, that is through first and second legs 18 and 20, protrudes through the side flanges 7, 9 of the track 6, member 8 of clip 2, through the web portion 33 of leg 18 (or web portion 31 of leg 20) of stud 4, and through member 10 of clip 2 to secure that part of the stud 4 to the track 6. The apertures 34 in members 8, 10 are preferably threaded to assist with providing a tightening action of the screw 32 against the sides of slot 28 in either flange 7, 9.

Figure 1A:
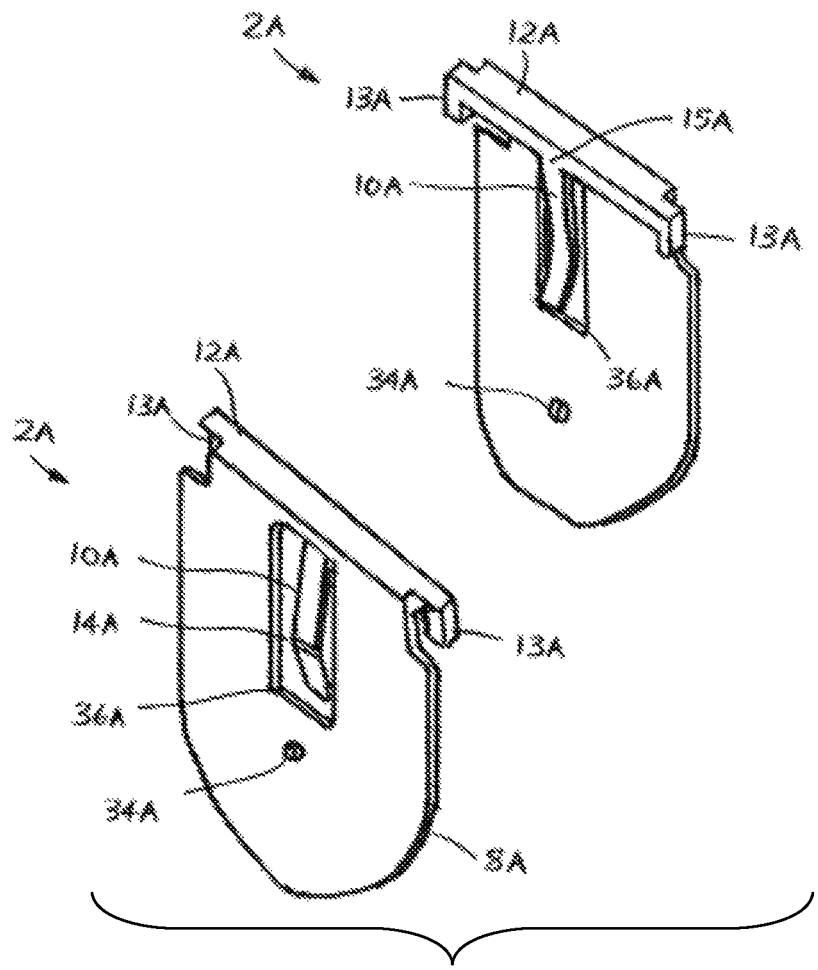
FIG. 1A shows a perspective view from above of a pair of clips according to another embodiment.

Referring to FIG. 1A there is shown an alternative clip 2A which is used to secure a vertical second component such as a stud 4 to a horizontal first component such as a track 6. The clip 2A has a first leg or first member 8A and a second member 10A that are joined by a web or connecting portion 12A. The essential differences between clip 2A and clip 2 is that the opening 36A is more elongate than opening 36 and that the member 10A has a longer protruding or curved section that forms the basis of the clip and that has the knee 14A. The top portion of member 10A has a narrower joining portion 15A to the web 12A. Web 12A has a pair of depending projections 13A either side of the portion 12A and this assists in locating and keeping the clip 2A at the top portions 22, 23 of the respective webs 31 or 33 of legs 20 or 18 of stud 4. In addition, the aperture 34A is generally smaller than the aperture 34 of clip 2 shown in FIG. 1 and this is used to locate a fastener means, particularly in the form of a nail, which can be used to secure the stud 4 to the track 6, particularly where a user uses a nail gun.

In use and assembling the clips 2 to secure a stud 4 to a track 6, the pair of clips 2 are attached to the top side (or bottom side) of stud 4 and, in particular, to a top portion 22 of leg 20 and to corresponding top portion 23 of leg 18 of the stud 4. The stud 4 is then placed in the desired position of the channel or interior of the track 6 and an interference fit occurs with each clip 2 and, in particular, between the outer face 21 of member 8 and the interior surfaces of flanges 7 and 9 of track 6. In this particular embodiment no fastening devices, such as screw 32, are used and the outer face 21 of member 8 is frictionally fitted to prevent up and down movement of stud 4 with respect to track 6. To prevent sideways movement, the plaster board of the interior wall is installed against the track 6 and stud 4.

Where a track 6 is requested to be supplied with slots 28, a fastener 32 is used. In the same manner as in relation to FIG. 4 the clips 2 are placed on the legs 18 and 20, either at the top or at the bottom of stud 4. The screws, examples of which is provided in FIG. 11, protrude through the aperture 34 of member 8 of one clip 2, then pierce through the respective web 33 and 31 of leg 18 or 20 of the stud 4 and then through the aperture 34 of the other member 10 of clip 2. Adjustment of the screw 32 can then be made, up and down, within the slot 28 and then securely tightened when a desired position is obtained. The length of the stud 4 can be determined from the amount of the lower part 25 of clip 2 protruding beneath the lower edges 27, 29 of flanges 7 or 9 of the track 6.

Referring to FIG. 5 there is shown an alternative embodiment of the clips 2 compared to FIG. 1. This embodiment, shown also in FIGS. 6 and 7, does not have apertures 34 through the clip 2 and does not use fastening means 32. Instead, generally located at the location of the aperture 34 in member 8 of clip 2 in FIG. 1, there is a protrusion 42 on the outside face 21, at an upper location thereof, of member 8. The protrusion 42 has a width which is substantially equal to the width of each slot 28 in track 6 so that an interference friction fit is formed between the inner longer sides of the slot 28 and the circumferential edge of protrusion 42. The shape of the protrusion 42 need not be restricted to being circular or cylindrical, it can square or rectangular in plan. The vertical position of the stud 4 in relation to the track 6 can still be adjusted through movement up or down of the protrusion 42 and clip 2 within the slot 28. Installation of the clip 2 is similar to that of FIG. 4 and FIG. 3, but as mentioned previously, adjustment is made through the interference fit of protrusion 42 within the slot 28. The legs 18 and 20 have an interference frictional fit within and between the members 8 and 10 of the respective clip 2.

In the embodiments of FIGS. 1 to 7, it has been mentioned that a fastener need not be used, nor a protrusion 42. In these situations, as well as embodiments using a fastener or protrusion, the clips 2 act to separate the metal stud 4 and metal track 6 to inhibit thermal and acoustic transfer and limit vibrations at this interface. This is particularly assisted by the connecting portion 12, 12A contacting the top or bottom edge 22 (of leg 20) and contact of leg 8 between the inside surface of either flange 7 or 9 of track 6 and the outside surface of web 31 or 33 of legs 20 and 18.

Referring to FIGS. 8 to 11 there is shown a fastening means in the form of a screw 50. It has a head 52, a tip 56 and a threaded shaft 54 which meets the underside of the head 52 at a junction or joining portion 60. Adjacent the joining portion 60 is a recess or slit 58 that extends circumferentially around the upper part of shaft 54.

Figure 12:
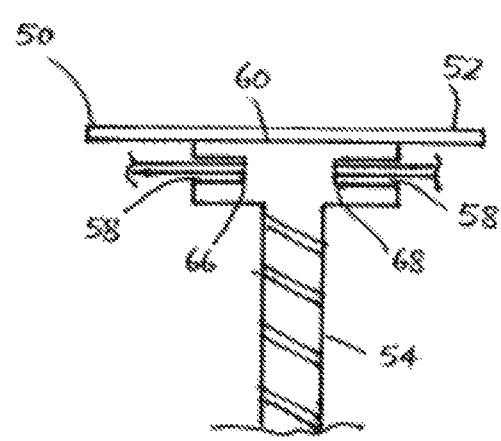
FIG. 12 is a side sectional view of engagement of the fastening means within the slot of the flange of the track.
Figure 9:
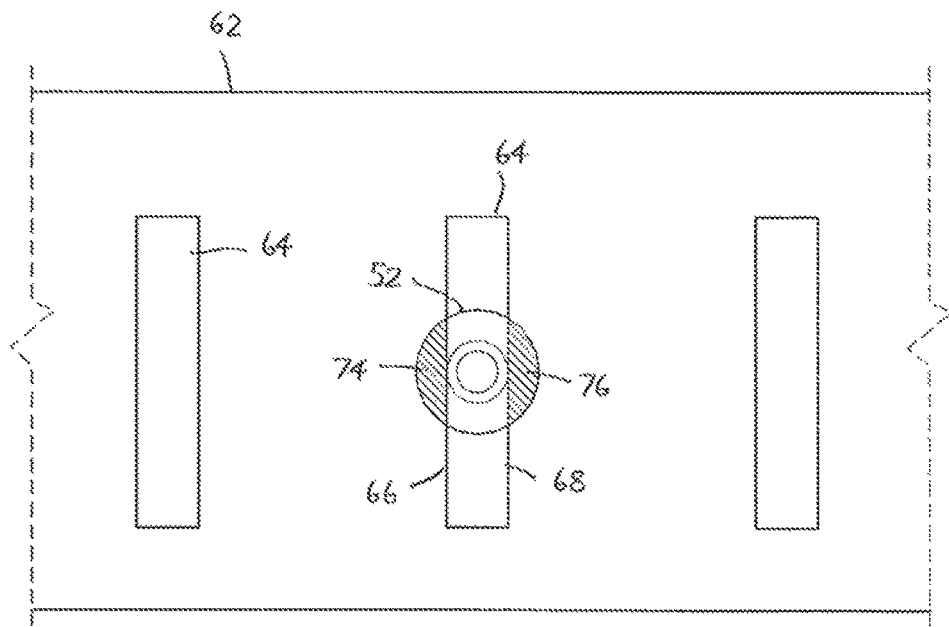
FIG. 9 is a side view showing the fastening means of FIG. 8 used in a slot of a flange of a track to secure a stud to the track.
Figure 10:
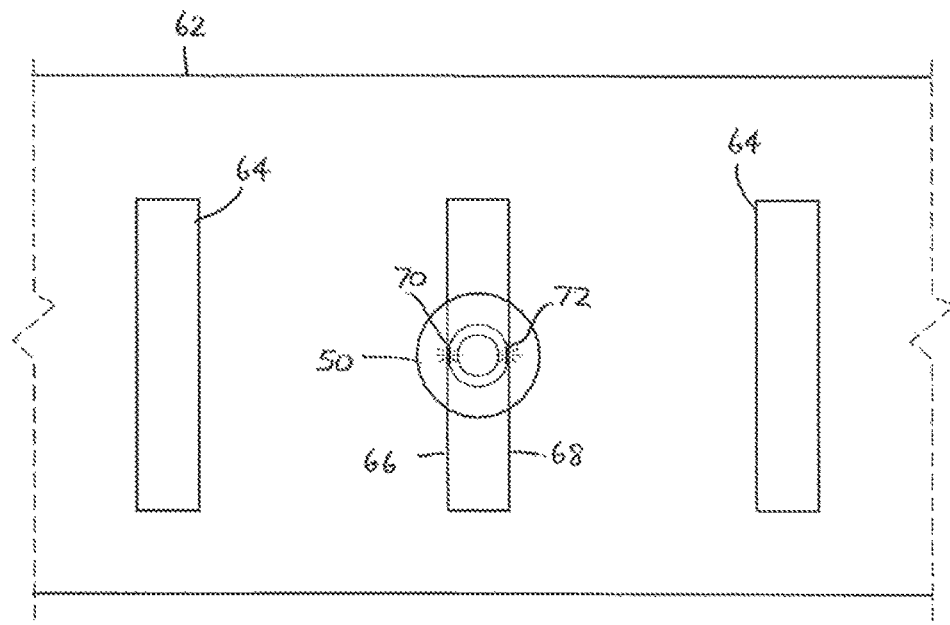
FIG. 10 is a view similar to FIG. 9 highlighting the contact of the fastening means with the slot so that the fastening means can move within the slot without dislodging the fastening means.

With reference to FIGS. 9 and 10, the slit or recess 58 is used to accommodate respective sides 66 and 68 of a slot 64 of a flange member (similar to flanges 7, 9 of track 6) of track 62. The point of contact between the screw 50 and the edges 66 and 68, through the recess 58 is shown at points 70 and 72 in FIG. 10, above the threaded shaft 54 and in FIG. 12, side on to the screw 50. The screw 50 can therefore be adjusted up and down within the confines of the slot 64 to make adjustment of the position of the stud 4 with respect to the track 6. The main advantage of this is that the screw 50 remains in position and is not dislodged from the slot 64 without significant force. Initially when placing the screw through the slot 64, a little force may be required to engage the recess 58 with the edges 66 and 68 of the slot 64.

Another advantage of the design of the screw 50 is its relatively large head 52, compared to the diameter of shaft 54, that presents a greater surface area to bear against the side flange of track 62 and on either side of the slot 64, as shown in the shaded regions 74, 76 in FIG. 9.

Referring to Table 1 below, it is seen that the screw 50 identified in the first row of the Table 1, with a head diameter of 14 mm, in a slot 64 having width of 5 mm, the underside area of the head 52 that contacts against the outer side of a dependent side flange of track 62, shown by the shaded region 74 has a surface contact area of 49.4 mm$^2$. This is doubled when the underside area of the head 52 contacts against the outer side of a dependent side flange of track 62 on the other side of the slot 64, designated by shaded area 76, effectively doubles the contact area to 98.8 mm$^2$. From Table 1 it is seen that there is a far superior contact area than any of the other three types of screws. This therefore provides or enables a thinner height or depth of the head 52 so that the head 52 effectively sits almost flush with the outer surface of the depending flange of track 62.

TABLE 1

| Comparison between standard screws: | | | | | |
|---|---|---|---|---|---|
| Head diameter (mm) | Slot width (mm) | Surface area-1 side (mm$^2$) | Total surface area (mm$^2$) | Comparison % | Comparison X |
| Studco SDT screw (50) 14.0 | 5 | 49.4 | 98.8 | | |
| 10G button head 12.0 | 5 | 27.4 | 54.8 | 55% | 1.8 |
| 8G button head 10.5 | 5 | 17.2 | 34.4 | 35% | 2.9 |
| 8G flat top 8.0 | 5 | 6.5 | 13 | 13% | 7.6 |

Figure 11:
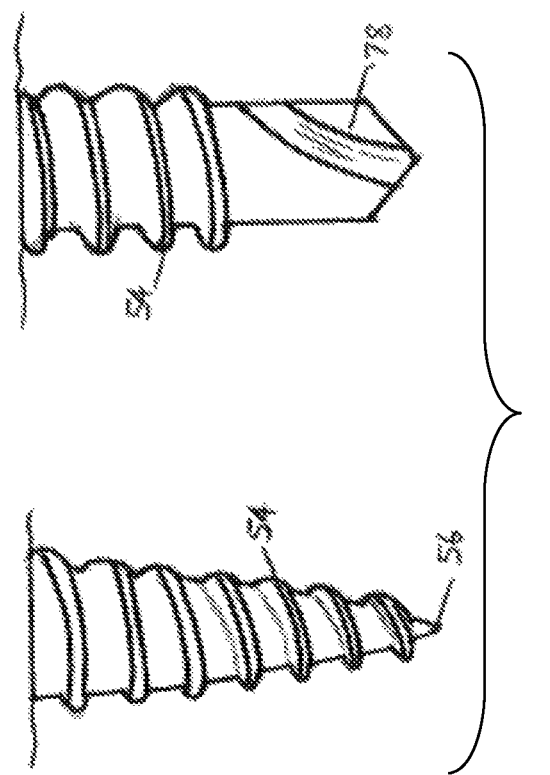
FIG. 11 is a view of a lower portion of two types of fastening means that can be used, one being a needle point screw and the other a self-drilling screw.
Figure 8:
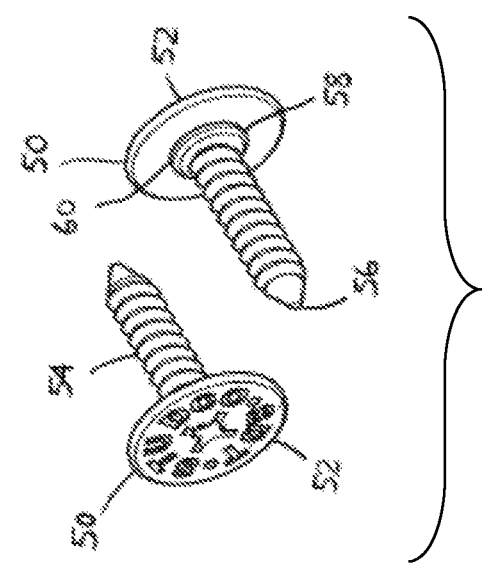
FIG. 8 is a perspective front and back views of a fastening means in accordance with one embodiment of the invention.

FIG. 11 shows in part view, different embodiments of a lower portion of the screw 50 which, on the left has an extended needle point terminating in point 56 and on the right is a self-drilling screw that has a recess 78 at the lower part thereof to remove any excess material of the object in which the self-drilling screw enters.

The invention claimed is:

1. A clip for fitting between a first component and a second component in a building structure, said clip including:
   a first member, a second member and a connecting portion extending between and connecting the first member to the second member wherein the second member includes a bent knee section which is biased towards an opening defined within the first member and when in an unbiased position lies in said opening of said first member;
   said first member, said second member and said connecting portion forming a space therebetween in which a portion of a leg of the second component is adapted to reside;
   said first member and said second member adapted for engagement with the portion of the leg of said second component; and
   first and second depending projections extending in spaced, parallel relation to each other from opposite ends of said connecting portion and extending between said first and second members, said second member extending from said connecting member at a location which is spaced from and midway between said first and second depending projections.

2. A clip according to claim 1 wherein the first member of the clip is substantially straight and is adapted to frictionally engage against a surface of a flange of the first component.

3. A clip according to claim 1 wherein the first member of the clip has an aperture adapted to allow a fastener to pass therethrough.

* * * * *